United States Patent
Weikard et al.

(10) Patent No.: US 6,191,181 B1
(45) Date of Patent: Feb. 20, 2001

(54) URETHANE ACRYLATES AND THEIR USE IN COATING COMPOSITIONS

(75) Inventors: Jan Weikard, Köln; Wolfgang Fischer, Meerbusch; Frank Richter, Leverkusen; Christian Zwiener, Köln, all of (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/433,854

(22) Filed: Nov. 4, 1999

(30) Foreign Application Priority Data

Nov. 20, 1998 (DE) .............................. 198 53 569

(51) Int. Cl.$^7$ ................................................. C08F 2/46
(52) U.S. Cl. ..................... 522/17.4; 522/96; 522/90; 522/167; 522/169; 522/173; 528/48; 528/59; 528/67; 540/200; 540/202; 540/356; 540/364; 544/67; 544/221
(58) Field of Search ...................... 528/59, 67; 540/200, 540/202, 356, 364; 544/67, 221; 522/96, 90, 167, 169, 173, 174

(56) References Cited

U.S. PATENT DOCUMENTS

| | | | |
|---|---|---|---|
| 3,782,961 | 1/1974 | Takahashi et al. | 96/115 R |
| 4,160,080 | * 7/1979 | Koenig et al. | 528/59 |
| 4,801,663 | * 1/1989 | Ueyanagi et al. | 525/528 |
| 4,870,152 | 9/1989 | Meixner et al. | 528/49 |
| 4,960,848 | * 10/1990 | Scholl et al. | 528/48 |
| 4,992,548 | * 2/1991 | Scholl et al. | 544/193 |
| 5,013,838 | * 5/1991 | Scholl | 544/193 |
| 5,128,432 | 7/1992 | Meixner et al. | 528/49 |
| 5,298,431 | * 3/1994 | Goldstein et al. | 528/491 |
| 5,717,091 | 2/1998 | Richter et al. | 544/67 |
| 5,914,383 | 6/1999 | Richter et al. | 528/59 |
| 6,107,484 | * 8/2000 | Richter et al. | 544/67 |

FOREIGN PATENT DOCUMENTS 2244486  2/1999 (CA) .

* cited by examiner

Primary Examiner—James J. Seidleck
Assistant Examiner—Sanza L. McClendon
(74) Attorney, Agent, or Firm—Joseph C. Gil; Thomas W. Roy

(57) ABSTRACT

The present invention relates to urethane acrylates, which may be cured with high-energy radiation, in which the urethane acrylates are the reaction product of a) a polyisocyanate component containing 20 to 100 mole %, based on the moles of the polyisocyanate component a), of iminooxadiazine dione group-containing polyisocyanate trimers corresponding to formula A

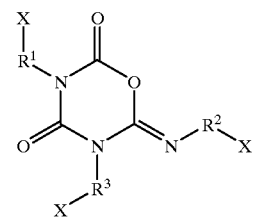

wherein $R^1$, $R^2$ and $R^3$ are the same or different and represent linear or branched, $C_4$–$C_{20}$ (cyclo)alkyl groups and X is the same or different and represents isocyanate groups or isocyanate group-containing radicals that also contain iminooxadiazine dione, isocyanurate, uretdione, urethane, allophanate, biuret or oxadiazine trione groups, wherein $R^1$, $R^2$ and $R^3$ are attached to a nitrogen atom, with b) an alcohol component containing at least one monobasic, hydroxy-functional, linear or branched $C_1$–$C_{12}$ alkyl ester of (meth)acrylic acid.

The present invention further relates to the use of the urethane acrylates as binder components for coating compositions that are curable with high-energy radiation.

3 Claims, No Drawings

URETHANE ACRYLATES AND THEIR USE IN COATING COMPOSITIONS

BACKGROUND OF THE INVENTION

1. Field of the Invention

The present invention relates to new urethane acrylates and to their use as a binder component in coating compositions that are curable with high-energy radiation.

2. Description of the Prior Art

Urethane acrylates are known as coating binders that are curable with high-energy radiation. A review is given in P. K. T. Oldring (Ed.), Chemistry & Technology of UV & EB Formulations for Coatings, Inks & Paints, Vol. 2, 1991, SITA Technology, London, pages 73–123. Urethane acrylates constitute high-grade coating binders for substrates, such as wood, metal and plastics and for mineral substrates.

Very different polyisocyanates can be used for the production of urethane acrylates. (Cyclo)aliphatic polyisocyanates are used for the production of urethane acrylates when it is necessary for the resulting coatings to be resistant to yellowing and weathering. Although hexamethylene diisocyanate is also disclosed as a suitable diisocyanate, e.g., in DE-A 2,115,373, it can be stated that this is a purely hypothetical disclosure. This diisocyanate cannot be used in the formulations described in this reference due to the tendency of the resulting urethane acrylates to crystallize. To be useful the lacquer binders have to be liquid under normal conditions.

DE-A 4,027,743 describes urethane acrylates prepared from hexamethylene diisocyanate, which are modified with ester alcohols such that they are liquid at room temperature. However, at temperatures below 10° C., these high- to medium viscosity products become turbid.

It is known from DE-A 4,232,013 that the following methods have been used to suppress the crystallization of urethane acrylates based on hexamethylene diisocyanate: the use of mixtures with other diisocyanates e.g. isophorone diisocyanate, the incorporation of alcohol components containing ester groups, and the incorporation of sterically-hindered mono- or dihydric alcohols that have a branched molecular structure. All of these measures restrict the options for production, and thus restrict the possibility of varying other properties, and generally result in high raw material costs.

Higher functionality polyisocyanates prepared from hexamethylene diisocyanate may also be used to prepare urethane acrylates. Thus, DE-A 3,737,244 describes urethane acrylates which are prepared from polyisocyanates containing isocyanurate groups. The higher functionality of these products results in coatings having better resistance properties. However, the tendency of these products to crystallize is even greater than for urethane acrylates prepared from hexamethylene diisocyanate.

An object of the present invention is to provide new, low-viscosity urethane acrylates which are resistant to yellowing, do not crystallize even at temperatures below 10° C. and are prepared from polyisocyanates having a functionality greater than 2.

Surprisingly, this object may be achieved in accordance with the present invention by using polyisocyanates containing iminooxadiazine dione groups to prepare urethane acrylates that exhibit a considerably reduced tendency to crystallize.

SUMMARY OF THE INVENTION

The present invention relates to urethane acrylates, which may be cured with high-energy radiation, in which the urethane acrylates are the reaction product of a) a polyisocyanate component containing 20 to 100 mole %, based on the moles of the polyisocyanate component a), of iminooxadiazine dione group-containing polyisocyanate trimers corresponding to formula A

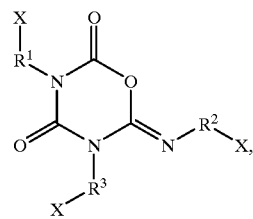

wherein $R^1$, $R^2$ and $R^3$ are the same or different and represent linear or branched, $C_4$–$C_{20}$ (cyclo)alkyl groups and X is the same or different and represents isocyanate groups or isocyanate group-containing radicals that also contain iminooxadiazine dione, isocyanurate, uretdione, urethane, allophanate, biuret or oxadiazine trione groups, wherein $R^1$, $R^2$ and $R^3$ are attached to a nitrogen atom, with b) an alcohol component containing at least one monobasic, hydroxy-functional, linear or branched $C_1$–$C_{12}$ alkyl ester of (meth)acrylic acid.

The present invention further relates to the use of the urethane acrylates as binder components for coating compositions that are curable with high-energy radiation.

DETAILED DESCRIPTION OF THE INVENTION

The isocyanate trimers of formula A, which are used for the production of the urethane acrylates according to the invention are known from EP-A 798,299 (U.S. Pat. No. 5,914,383, herein incorporated by reference) or German Patent Application DE-A 19 734 048.2 (copending application U.S. Ser. No. 09/126,303, herein incorporated by reference). The isocyanate trimers which are preferably used are those produced by the partial oligomerization of hexamethylene diisocyanate (HDI), 1,3-bis(isocyanatomethyl)-cyclohexane ($H_6$XDI) or isophorone diisocyanate (IPDI). It is immaterial whether or not the diisocyanate starting material to be oligomerized is completely separated from the reaction products after partial oligomerization.

The isocyanate trimers of formula, which are preferably used for the production of the urethane acrylates according to the invention, are those having a viscosity at 23° C. of 300 to 3000 mPa·s, preferably 500 to 2000 mPa·s, more preferably 500 to 1500 mPa·s and most preferably 1000 to 1500 mPa·s; an NCO content of preferably 15 to 30% by weight, more preferably 20 to 25% by weight; and a content of unreacted starting diisocyanates, of less than 5.0% by weight, preferably less than 1.0% by weight and more preferably less than 0.5% by weight.

Alcohol component b) is selected from one or more monobasic hydroxy-functional esters of (meth)acrylic acid. The latter is to be understood to include both esters of acrylic acid and esters of methacrylic acid. Examples include the hydroxy-group containing esters obtained by reacting acrylic acid or methacrylic acid with dihydric alcohols, such as 2-hydroxyethyl, 2- or 3-hydroxy-propyl or 2-, 3- or 4-hydroxybutyl (meth)acrylates.

Also suitable are monohydric alcohols containing (meth) acryloyl groups and reaction products substantially containing monohydric alcohols which are obtained by the esterification of n-hydric alcohols with (meth)acrylic acid, wherein "n" preferably represents a whole number, or a fractional number ranging from greater than 2 to 4, preferably 3, and wherein (n−0.8) to (n−1.2), preferably (n−1) moles of (meth)acrylic acid are used per mole of alcohols. Mixtures of different alcohols can also be used as the alcohols.

Examples of these compounds include the reaction products of i) glycerol, trimethylolpropane and/or pentaerythritol, or low molecular weight alkoxylation products of these alcohols (such as ethoxylated or propoxylated trimethylolpropane, e.g. the addition product of ethylene oxide and trimethylolpropane, OH number 550). Also suitable are mixtures of at least trihydric alcohols of this type with dihydric alcohols such as ethylene glycol or propylene glycol for example, with (ii) (meth)acrylic acid in the preceding molar ratio.

These compounds have a number average molecular weight of 116 to 1000, preferably 116 to 750 and more preferably 116 to 158.

Mono- or dihydric alcohols which have a molecular weight of 100 to 300, preferably 130 to 200, contain ether and/or ester groups and have a branched structure can optionally be used as a further constituent of the alcohol component. Examples include 2,2-diethyl-1,3-propanediol, 2,2-dimethyl-1,3-propanediol, 2-ethyl-1,3-hexanediol, 2,5-dimethyl-1,6-hexanediol, 2,2,4-trimethyl-1,3-pentanediol, (3-hydroxy-2,2-dimethyl-propyl)-3-hydroxy-2,2-dimethyl propionate and trimethylolpropane formal.

The reaction of starting components a) and b) can be carried out in the absence of solvents or in solvents which are inert to isocyanates and hydroxyacrylates. Example include acetone, 2-butanone, ethyl acetate, n-butyl acetate and low molecular weight esters of (meth)acrylic acid, which are known by the generic term "reactive thinners" for curing under the effect of high-energy radiation (e.g., those described in P. K. T. Oldring (Ed.), Chemistry & Technology of UV & EB Formulations for Coatings, Inks & Paints, Vol.2, 1991, SITA Technology, London, pages 237–285). The reaction is carried out at temperatures of preferably 20 to 100° C., more preferably 40 to 80° C. Starting components a) and b), and the individual constituents of components a) and b), can be reacted in any sequence when carrying out the method according to the invention. The NCO/OH equivalent ratio of components a) and b) is 0.7:1 to 1:1, preferably 0.9:1 to 0.95:1.

In one preferred embodiment of the method, component a) is placed in a suitable reaction vessel and that portion of component b) that contains hydroxy-functional esters of (meth)acrylic acid is first added then reacted at the preceding temperatures until an NCO content is reached which corresponds to the complete conversion of the hydroxy-functional esters of (meth)acrylic acid. The remainder of component b), which may optionally be present and does not contain esters of (meth)acrylic acid is subsequently added, and again reacted at the aforementioned temperatures until an NCO content is reached which corresponds to as complete reaction of the hydroxy-functional component which is possible.

If component b) contains a constituent which is not an ester of (meth)acrylic acid, the preferred molar ratio, based on hydroxy groups, of the constituent which contains (meth) acrylic acid esters to the constituent which is free from (meth)acrylic acid is 99:1 to 7:1, more preferably 50:1 to 10:1.

The reaction of components a) and b) can be conducted with or without catalysts. Suitable catalysts are known from urethane chemistry and include tin(II) octoate, dibutyltin dilaurate and tertiary amines such as diazabicyclooctane.

The resulting products preferably have an NCO content of less than 0.5% by weight, more preferably less than 0.1% by weight.

In order to prevent unwanted, premature polymerization, both during the reaction and during subsequent storage, it is recommended that 0.01 to 0.3% by weight, based on the total weight of the reactants, of known polymerization inhibitors or antioxidants may be added to the reaction mixture. Examples of these additives are described in "Methoden der organischen Chemie" (Houben-Weyl), 4th Edition, Volume XIV/1, page 433 et seq., Georg Thieme Verlag, Stuttgart 1961, and include phenols, cresols and/or hydroquinones.

In a preferred embodiment of the preparation method, an oxygen-containing gas, preferably air, is passed through the reaction mixture in order to prevent unwanted polymerization of the (meth)acrylates.

The urethane acrylates according to the invention can be employed as the sole binder component or can be used in admixture with other binder components that may be cured by radiation.

These binder components are described, for example, in P. K. T. Oldring (Ed.), Chemistry & Technology of UV & EB Formulations for Coatings, Inks & Paints, Vol. 2, 1991, SITA Technology, London, pages 31–235. Examples include urethane acrylates, epoxy acrylates, polyester acrylates, polyether acrylates and unsaturated polyesters.

In addition, the binder vehicles according to the invention can be used in a form in which they are thinned by solvents. Examples of suitable solvents include acetone, 2-butanone, ethyl acetate, n-butyl acetate, methoxypropyl acetate and low molecular weight esters of (meth)acrylic acid. The mono-, di- or oligo esters of (meth)acrylic acid are known as reactive thinners. Their function is to reduce the viscosity of the uncured coating composition and to be incorporated into the polymer by polymerization during curing.

These compounds are described in P. K. T. Oldring (Ed.), Chemistry & Technology of UV & EB Formulations for Coatings, Inks & Paints, Vol. 2, 1991, SITA Technology, London, pages 237–285. Examples include esters formed from acrylic acid or methacrylic acid, preferably acrylic acid, with the following alcohols: monohydric alcohols, such as the isomeric butanols, pentanols, hexanols, heptanols, octanols, nonanols and decanols; cycloaliphatic alcohols such as isoborneol, cyclohexanol, alkylated cyclohexanols and dicyclopentanol; arylaliphatic alcohols such as phenoxyethanol and nonyl phenyl ethanol; and tetrahydrofurfuryl alcohols. Also suitable are alkoxylated derivatives of these alcohols.

Examples of dihydric alcohols include alcohols such as ethylene glycol, 1,2-propanediol, 1,3-propanediol, diethylene glycol, dipropylene glycol, the isomeric butanediols, neopentyl glycol, 1,6-hexanediol, 2-ethylhexanediol, tripropylene glycol and alkoxylated derivatives of these alcohols. The preferred dihydric alcohols are 1,6-hexanediol, dipropylene glycol and tripropylene glycol. Examples of trihydric alcohols include glycerol, trimethyolpropane and alkoxylated derivatives thereof. Propoxylated glycerol is preferred. The polyhydric alcohols which can be used include pentaerythritol or ditrimethylol propane and alkoxylated derivatives thereof.

A photoinitiator component can also be added for the curing process by high-energy radiation. These components comprise initiators which are known in the art and which are capable of initiating polymerization by a free radical mechanism after irradiation by high-energy radiation. Suitable photoinitiators are described in P. K. T. Oldring (Ed.), Chemistry & Technology of UV & EB Formulations for Coatings, Inks & Paints, Vol. 3, 1991, SITA Technology, London, pages 61–325, for example. They are used in amounts of 0.1 to 10 parts by weight, preferably 2 to 7 parts by weight and more preferably 3 to 4 parts by weight, based on the weight of components a) and b).

The urethane acrylates according to the invention can be mixed with the known additives for polyurethane coating compositions, such as extenders, pigments, colorants, thixotropic agents, glossing agents, matting agents and flow enhancers, which are employed in customary amounts.

The invention is further illustrated but is not intended to be limited by the following examples in which all parts and percentages are by weight unless otherwise specified.

EXAMPLES

Example 1

Production of component a)

1000 g (5.95 mole) of HDI were placed in a stirred apparatus fitted with an internal thermometer, a reflux condenser, a gas inlet tube and a metering device for catalyst solution and were initially freed from dissolved gases at 60° C. and a pressure of about 0.1 mbar for one hour. Dry nitrogen was then passed through the batch, and a solution of tetrabutylphosphonium hydrogen difluoride ($Bu_4P^+F^-\cdot xHF$) in methanol/isopropanol was added in portions over about 20 to 50 minutes. During the addition a gentle stream of nitrogen was passed through the batch at an internal temperature of 60° C., in such a way that the internal temperature did not exceed 70° C. The catalyst solution contained 4.75% $F^-$, which did not represent the total fluorine content, and was prepared as described in German Patent Application DE-A 19 824 485.2 (co-pending application U.S. Ser. No. 09/320,366, herein incorporated by reference), Example 1a—stock solution 1). After the refractive index $n^D20$ had reached the value given below, further reaction was suppressed (see below) by adding an amount of di-n-butyl phosphate, which corresponded to the molar consumption of fluoride. The batch was stirred for a further hour at 60° C. and unreacted HDI was subsequently separated by thin-layer distillation in a short-tube evaporator at 0.15 mbar, using a heating medium at a temperature of 180° C. The properties of polyisocyanate component a), which contained HDI iminooxadiazine dione groups, are set forth below:

Example 1a

Further reaction was suppressed at: $n^D20=1.4620$, which corresponded to the consumption of 421 mg of the catalyst solution and to the use of 221 mg di-n-butyl phosphate as the terminating reagent.

Resin data:

NCO content: 23.8%, titrated according to DIN 53 185

Dynamic viscosity at 23° C.: 760 mPa·s (Newtonian flow properties)

Free HDI: 0.07% (determined by gas chromatography)

Hazen color: 21 Apha.

45 mole % of the isocyanate groups of HDI, which were converted in the oligomerization reaction, were present as iminooxadiazine dione groups and 52 mole % were present as isocyanurate groups. The difference from 100 mole % was essentially due to uretdione groups (determined by $^{13}C$ NMR spectroscopy, as described in copending application U.S. Ser. No. 09/318,537, herein incorporated by reference, and in "Die Angewandte Makromolekulare Chemie 1986, 141, 173–183").

Example 1b

Further reaction suppressed at: $n^D20=1.4670$, which corresponded to the consumption of 410 mg of the catalyst solution and to the use of 215 mg of di-n-butyl phosphate as the terminating reagent.

Resin data:

NCO content: 23.2%, titrated according to DIN 53 185

Dynamic viscosity at 23° C.: 1120 mPa·s (Newtonian flow properties)

Free HDI: 0.11% (determined by gas chromatography)

Hazen color: 23 Apha

Iminooxadiazine dione groups: 43 mole %

Isocyanurate groups: 56 mole %.

Example 2

305.3 g of the polyisocyanate from Example 1a) were dissolved in 122.7 g of butyl acetate, and 0.1 g of dibutyltin dilaurate and 0.49 g of 2,6-di-tert.-butyl-4-methyl-phenol were added to the resulting mixture. The solution was heated to 60° C. while passing air through it and while stirring. The source of heat was removed, and initially 64.4 g of 2-hydroxypropyl acrylate and secondly 134.0 g of hydroxyethyl acrylate were added drop-wise in such a way that the temperature did not exceed 60° C. The reaction was complete when the NCO content of the solution was less than 0.10% by weight.

Example 3

615.4 g of the polyisocyanate from Example 1b) were treated with 0.5 g of dibutyltin dilaurate and 1.0 g of 2,6-di-tert.-butyl-4-methyl-phenol. The solution was heated to 60° C. while passing air through it and while stirring. The source of heat was removed, and 394.4 g of 2-hydroxyethyl acrylate were added dropwise such that the temperature did not exceed 60° C. The reaction was complete when the NCO content of the solution was less than 0.10% by weight. A further 0.5 g of di-tert.-butyl-4-methyl-phenol were subsequently stirred in over 10 minutes at 60° C. as a stabilizer.

Example 4

Example 3 was repeated with the exception that 202.0 g of butyl acetate were initially placed in the reaction vessel.

Example 5

435.0 g of the polyisocyanate from Example 1b) were dissolved in 176.0 g of 1,6-hexanediol diacrylate, and 0.35 g of dibutyltin dilaurate and 0.35 g of 2,6-di-tert.-butyl-4-methyl-phenol were added thereto. The solution was heated to 60° C. while passing air through it and while stirring. The source of heat was removed, and initially 78.0 g of 2-hydroxypropyl acrylate, secondly 162 g of hydroxyethyl acetate, and finally 29.0 g of 2-ethyl-1,3-hexanediol were added dropwise such that the temperature did not exceed 60° C. The reaction was complete when the NCO content of the solution was less than 0.10% by weight. A further 0.35 g of di-tert.-butyl-4-methyl-phenol were subsequently stirred in over 10 minutes at 60° C. as a stabilizer.

Comparison Examples

Comparison Example 6

239.2 g of Desmodur N 3600 (an product of Bayer AG, Leverkusen, essentially containing HDI isocyanurate, NCO content: 23.4% by weight, viscosity 1200 mPa·s at 23° C.) were dissolved in 98.9 g of butyl acetate, and 0.2 g of dibutyltin dilaurate and 0.4 g of 2,6-di-tert.-butyl-4-methyl-phenol were added thereto. The solution was heated to 60° C. while passing air through it and while stirring. The source of heat was removed, and initially 50.7 g of 2-hydroxypropyl acrylate and secondly 105.6 g of hydroxy-ethyl acrylate were added dropwise such that the temperature did not exceed 60° C. The reaction was complete when the NCO content of the solution was less than 0.10% by weight.

Comparison Example 7

248.4 g of the polyisocyanate starting materials form Example 6 were dissolved in 102.3 g of butyl acetate and were treated with 0.2 g of dibutyltin dilaurate and 0.4 g of 2,6-di-tert.-butyl-4-methyl-phenol. The solution was heated to 60° C. while passing air through it and while stirring. The source of heat was removed, and 156.6 g of hydroxyethyl acrylate were added dropwise such that the temperature did not exceed 60° C. The reaction was complete when the NCO content of the solution was less than 0.10% by weight. A further 0.1 g of di-tert.-butyl-4-methyl-phenol were subsequently stirred in over 10 minutes at 60° C. as a stabilizer.

Example of Use 8

The viscosities of the products produced were determined by means of a rotating viscometer at 23° C. To test the tendency of the products to crystallize, one part of each product was stored at 23° C. and another part of each product at 8° C. All samples were checked daily for possible thickening/cry-tallization. Products that exhibited thinnckening/crystallization were subsequently heated for 60 minutes at 60° C. and were the stirred briefly. The initial viscosity, which was measured shortly after the production thereof, was obtained again.

| Example | Concentration [solvent] | Viscosity [mPa.s] | Storage at 23° C. | Storage at 8° C. |
|---|---|---|---|---|
| 2 | 80% (BuAc) | 1130 | >14 days | >14 days |
| 6 (comparison) | 80% (BuAc) | 1520 | >14 days | 8 days |
| 3 | 100% | 248,000 | >14 days | not determined |
| 4 | 80% (BuAc) | 3600 | >14 days | >14 days |
| 7 (comparison) | 80% (BuAc) | 9350 | 5 days | 2 days |
| 5 | 80% (HDDA) | 25500 | >14 days | >14 days |

BuAc = n-butyl acetate, HDDA = hexanediol diacrylate

A comparison of Examples 2 and 6 and of Examples 4 and 7 shows that the products according to the invention had a lower viscosity and exhibited significantly improved storage stability.

The products according to the invention obtained in Examples 2 to 5 and the comparison products obtained in Examples 6 and 7 were each treated with 2.5% by weight of Darocur 1173 (a photoinitiator available from Ciba Spezialtätenchemie GmbH). After applying the coating compositions to cardboard (thickness of application: 250 g/m$^2$), the coated samples were passed under a high-pressure mercury vapor lamp (Hanovia, 80 W/cm, at a distance of 10 cm). At a belt speed of at least 10 m/minute, solvent- and scratch-resistant coatings were formed. The term "solvent-resistant" in this instance means that the coating still appeared perfect after least 30 double strokes with a cloth saturated with n-butyl acetate under a load of 1 kg.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A urethane acrylate, which may be cured with high-energy radiation, in which the urethane acrylate is the reaction product of a) a polyisocyanate component containing 20 to 100 mole %, based on the moles of the polyisocyanate component a), of an iminooxadiazine dione group-containing polyisocyanate trimer corresponding to formula A

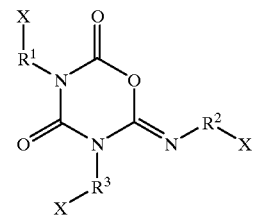

wherein

R$^1$, R$^2$ and R$^3$ are the same or different and represent linear or branched, C$_4$–C$_{20}$ (cyclo)alkyl groups and X is the same or different and represents isocyanate groups or isocyanate group-containing radicals that also contain iminooxadiazine dione, isocyanurate, uretdione, urethane, allophanate, biuret or oxadiazine trione groups, wherein R$^1$, R$^2$ and R$^3$ are attached to a nitrogen atom, with b) an alcohol component containing at least one monobasic, hydroxy-functional, linear or branched C$_1$–C$_{12}$ alkyl ester of (meth)acrylic acid.

2. The urethane acrylate of claim 1 wherein at least a portion of R$^1$, R$^2$ and R$^3$ are 1,6-hexamethylene groups.

3. A coating composition, which is curable under the effect of high-energy radiation, having a binder comprising the urethane acrylate of claim 1.

* * * * *